(12) United States Patent
Konishi et al.

(10) Patent No.: US 8,357,754 B2
(45) Date of Patent: *Jan. 22, 2013

(54) PROCESS FOR PRODUCING MICROPOROUS POLYMERIC OBJECT, AND MICROPOROUS POLYMERIC OBJECT AND SEPARATION MEMBRANE

(75) Inventors: Takahisa Konishi, Osaka (JP); Takuji Shintani, Osaka (JP); Yushu Matsushita, Aichi (JP); Atsushi Takano, Aichi (JP); Takeshi Asari, Chiba (JP)

(73) Assignee: Nitto Denko Corporation, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/466,600

(22) Filed: May 8, 2012

(65) Prior Publication Data

US 2012/0252912 A1    Oct. 4, 2012

Related U.S. Application Data

(63) Continuation of application No. 12/521,952, filed as application No. PCT/JP2008/050045 on Jan. 7, 2008.

(30) Foreign Application Priority Data

Jan. 11, 2007 (JP) ................... 2007-003336

(51) Int. Cl.
  C08L 53/00   (2006.01)
  C08L 31/00   (2006.01)
  C08L 29/00   (2006.01)
(52) U.S. Cl. ............... 525/89; 525/88; 525/94; 525/96; 525/373; 521/139
(58) Field of Classification Search .......... 525/88, 525/89, 94, 96, 373; 521/139
See application file for complete search history.

(56) References Cited

U.S. PATENT DOCUMENTS 5,700,903 A   12/1997   Hancock et al.
6,214,936 B1   4/2001   Mehler et al.
(Continued)

FOREIGN PATENT DOCUMENTS

JP   2-279741   11/1990
JP   4-022428    1/1992
(Continued)

OTHER PUBLICATIONS

Hasegawa, H. et al. "Bicontinuous Microdomain Morphology of Block Copolymer. 1. Tetrapod-Network Structure of Polystyrene-Polyisoprene Diblock Polymer", Macromolecules, vol. 20, 1987, pp. 1651-1662.

(Continued)

*Primary Examiner* — Randy Gulakowski
*Assistant Examiner* — Kara Boyle
(74) *Attorney, Agent, or Firm* — Hamre, Schumann, Mueller & Larson, P.C.

(57) ABSTRACT

A process for producing a microporous polymeric object to improve the degree of freedom for its various properties, compared to conventional processes, includes: mixing a block copolymer made of three or more kinds of segments with a polymer, wherein one or more of the segments are made of monomer units having a first functional group forming ionic and/or hydrogen bond, the segments constitute a co-continuous structure having mutually-independent and continuous regions due to a phase separation based on incompatibility between the segments, and the polymer has, at other than polymer chain terminals, a second functional group forming such bond with the first functional group, thereby allowing the segments to associate with the polymer at many points; forming a co-continuous structure including a region composed of the polymer and the segments due to the phase separation; and removing the polymer from the region by weakening the bond between the functional groups.

13 Claims, 6 Drawing Sheets

U.S. PATENT DOCUMENTS

| | | | |
|---|---|---|---|
| 6,433,931 B1 * | 8/2002 | Fink et al. | 359/586 |
| 7,090,784 B2 | 8/2006 | Asakawa et al. | |
| 2003/0222048 A1 | 12/2003 | Asakawa et al. | |
| 2009/0173694 A1 | 7/2009 | Peinemann et al. | |

FOREIGN PATENT DOCUMENTS

| | | |
|---|---|---|
| JP | 5-287084 | 11/1993 |
| JP | 10-330528 | 12/1998 |
| JP | 11-080414 | 3/1999 |
| JP | 2000-033246 | 2/2000 |
| JP | 2002-241532 | 8/2002 |
| WO | 2008/034487 | 3/2008 |

OTHER PUBLICATIONS

Mogi, Y. et al. "Preparation and Morphology of Triblock Copolymers of the ABC Type", Macromolecules, vol. 25, 1992, pp. 5408-5411.

Matsushita, Y. et al. "Molecular Design of Block- and Graft Polymers and Their Nanophase-Separated Hierarchical Structures in Condensed Systems", Kobunshi Ronbunshu, vol. 63, No. 4, 2006, pp. 205-218.

Liu, et al., "Preparation and Properties of Nanoporous Triblock Copolymer Membranes" Angew. Chem. Int. Ed., vol. 38, No. 6, 1999, pp. 835-838.

* cited by examiner

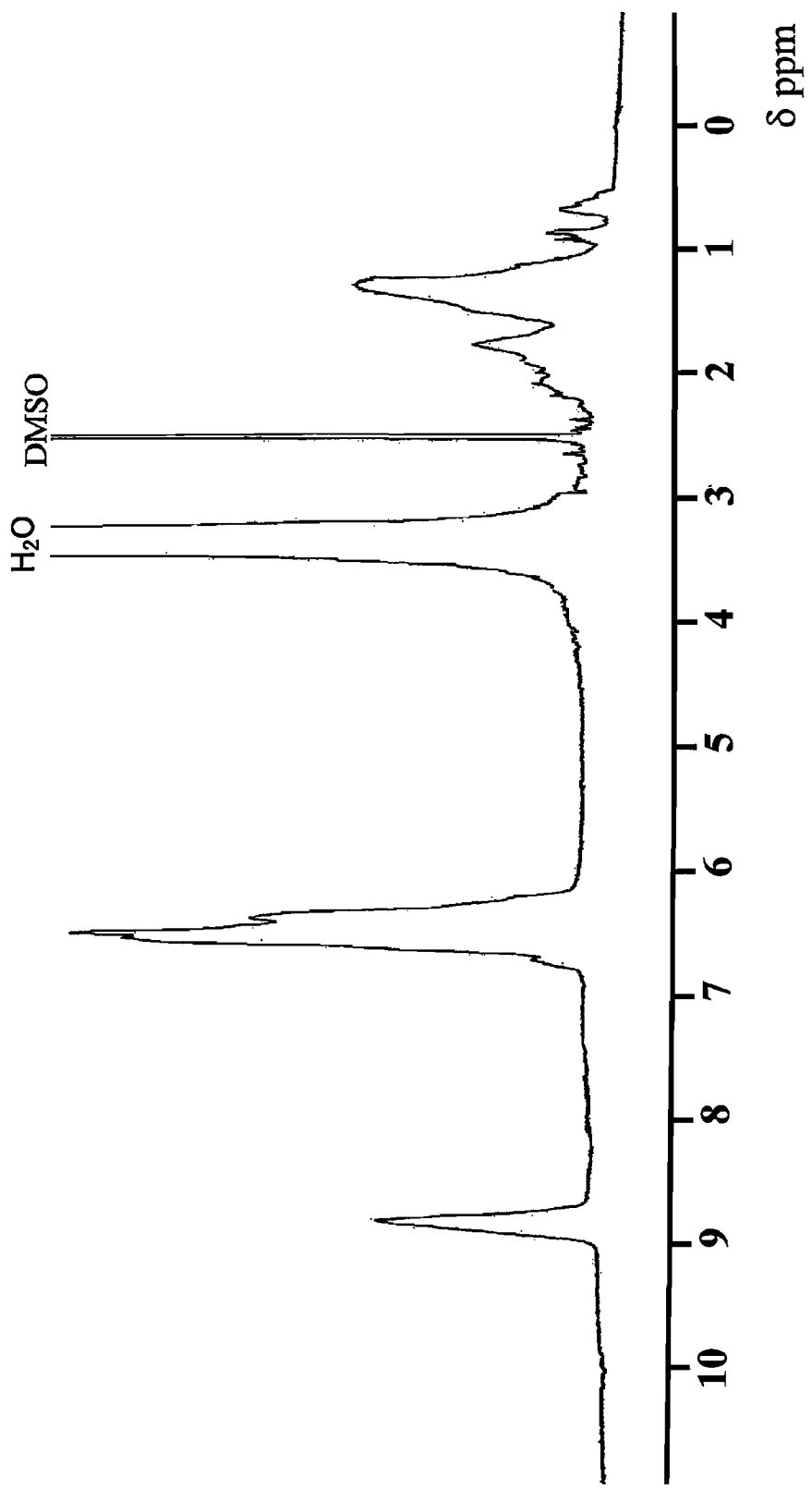

PROCESS FOR PRODUCING MICROPOROUS POLYMERIC OBJECT, AND MICROPOROUS POLYMERIC OBJECT AND SEPARATION MEMBRANE

CROSS REFERENCE TO RELATED APPLICATIONS

This application is a Continuation of application Ser. No. 12/521,952, filed Jul. 1, 2009, which is a U.S. National Stage of PCT/JP2008/050045, filed Jan. 7, 2008, which applications are incorporated herein by reference.

TECHNICAL FIELD

The present invention relates to a process for producing a microporous polymeric object provided with continuous pores, and suitable for use, for example, as a separation membrane.

BACKGROUND ART

Currently, separation membranes made of polymer membranes are used widely in various fields such as water treatment (e.g. for eliminating bacteria or viruses in water), medical treatment (e.g. for dialysis), and industry (e.g. for producing ultrapure water). The separation membranes are provided with continuous pores that communicate between both main surfaces of the membrane. Separation membranes can be classified by the pore diameter into microfiltration membrane (MF membrane), ultrafiltration membrane (UF membrane), nanofiltration membrane (NF membrane), reverse osmosis membrane (RO membrane) or the like.

Although use as a separation membrane is not necessarily intended, processes for producing a microporous polymeric object having continuous pores are disclosed in JP2 (1990)-279741A (document 1), JP5 (1993)-287084A (document 2), and JP11 (1999)-80414A (document 3). In the processes of the documents 1 to 3, phase separation of polymer is used for forming the pores. Phase separation of polymer can be classified by its scale into microphase separation (also referred to as nanophase separation: wherein the scale of phase separation is less than 1 μm, typically several nm to several hundred nm), and macrophase separation (wherein the scale of phase separation is 1 μm or more, typically several μm to several ten μm).

As an example of microphase separation, there is a phase separation due to incompatibility between segments in a block copolymer, where various phase separation structures, such as globular structure, columnar structure, co-continuous structure, lamellar structure, or the like, are known to be formed depending on the composition of the copolymer. For the use as a separation membrane, it is preferable to use microphase separation where a co-continuous structure is formed, because such separation enables formation of winding pores that are continuous three-dimensionally. However, usually, the composition range of a block copolymer that allows such microphase separation is quite narrow. For example, H. Hasegawa et al., "Bicontinuous Microdomain Morphology of Block Copolymers. 1. Tetrapod-Network Structure of Polystyrene-Polyisoprene Diblock Polymers", Macromolecules, vol. 20, p. 1651-1662 (1987) discloses that, in AB-type diblock copolymer made of two mutually-different segments, a co-continuous structure is formed only in a quite narrow range where one volume fraction thereof is 0.34 to 0.38.

In the process of the document 1, mixing a polymer (A) having a functional group (a) capable of ionic bonding at both terminals of the polymer chain and a polymer (B) having a functional group (b) capable of ionic bonding with the functional group (a), the polymer (B) and the terminals of the polymer (A) are ionic-bonded so as to form a pseudo-block copolymer, thereby allowing microphase separation between the region made of polymer (A) and the region made of polymer (B) and forming a polymer thin film having a microphase structure made of the polymers (A) and (B). After that, by breaking the ionic bond between the polymer (A) and the polymer (B) to extract and remove either the polymer (A) or (B) from the polymer thin film obtained by the phase separation, a microporous polymer thin film is obtained. The obtained polymer thin film is made of only either one of the polymers (A) or (B) that has not been extracted and removed. However, in this process, since the ionic bond developed between the polymers (A) and (B) is a bond based on the functional groups located at the terminals of the polymer chain, the bond ratio with the polymer is low. Further, the bonding force is smaller compared to a normal bonding force (shared bond) between segments in a block copolymer. That is, since the force and number of the bond developed between the two polymers are both small, it is difficult to cause microphase separation stably. Furthermore, practically, since it is not phase separation of a block copolymer but phase separation in a state where a plurality of the polymers (A) are bonding to a single polymer (B), formation of a co-continuous structure, which already occurs with difficulty in a block copolymer, may become even less likely to occur. Actually, in the document 1, only a lamellar structure is disclosed as a phase separation structure, while co-continuous structure is neither disclosed nor suggested therein.

The document 2 discloses a process for widening the copolymer composition range where a co-continuous structure can be formed due to microphase separation, in AB-type or ABA-type copolymer that is a two-component block copolymer made of two kinds of mutually-incompatible segments (in the document 2, which are referred to as "polymer chains" or "block chains") A and B. In one of the processes disclosed in the document 2, a polymer having compatibility with the segment A is mixed to the copolymer (see e.g. claim 4 in the document 2). In this process, the molecular weight distribution of the polymer to be mixed is required to be broad for swelling (which is carried out by the polymer with a relatively low molecular weight) and filling (which is carried out by the polymer with a relatively high molecular weight and with similar molecular weight to the segment A) of the segment A, when forming a co-continuous structure (see e.g. paragraph number [0029] and Example 4 in the document 2). Also, in the document 2, there is described that a microporous membrane with a three dimensional network structure can be obtained, by removing either one of the segments, by ozonolysis, in a block copolymer with a co-continuous structure formed due to microphase separation, or extracting the mixed polymer by means of a selective solvent.

According to the process of the document 3, a block copolymer having two or more kinds of segments and a first homopolymer are mixed, followed by a macrophase separation into the region made of the block copolymer and the region made of the first homopolymer. Subsequently, after the microphase separation of the block copolymer, pores are formed by elution of the first homopolymer, so that continuous pores are formed by further elution of one phase of the block copolymer remaining as a framework, or elution, from the block copolymer, of a second homopolymer added for controlling the final microphase separation as needed (cf.

paragraph number [0012] in the document 3). In the document 3, it is exemplified that, in order to elute one phase of the block copolymer, a block copolymer that is degradable by ozone or light is used, or a pseudo-block copolymer by ionic bond at the terminals of the polymer chain, as disclosed in the document 1, is used. However, in the process of the document 3, when using a pseudo-block copolymer by ionic bond as disclosed in the document 1, the same problem as described in the above document 1 may occur. Further, basically in this process, the diameter of the pores formed due to macrophase separation is too large to use the obtained porous polymeric object as a separation membrane.

In paragraph number [0011] of the document 3, there is described, "the present invention uses microphase separation structure of the copolymer, as disclosed in JP5 (1993)-2807804A (which may be a clerical error for JP5-287084A), as well as macrophase separation between (the first) homopolymer mixed in the system and the copolymer, and thereby . . . ". In view of this, the second homopolymer added for controlling the microphase separation may be equivalent to a polymer (including the polymer made of monomer units constituting the segment A) that has broad molecular weight distribution and compatibility with the segment A and that has been added for the purpose of swelling and filling of the segment A, in the document 2.

Although it has no direct relationship to formation of a microporous polymeric object, it is known that, in a three-component block copolymer where the contained monomer units are made of three mutually-different segments A, B and C, the composition range of the copolymer where a co-continuous structure is formed due to microphase separation is wider, compared to the two-component block copolymer where the contained monomer units are made of two mutually-different segments A and B (which is described in, e.g. Yasuhiro Mogi et al., "Preparation and Morphology of Triblock Copolymer of the ABC Type", Macromolecules, vol. 25, p. 5408-5411 (1992), and Yushu Matsushita, Atsushi Takano, Naoya Torikai, and Atsushi Noro, "Molecular Design of Block- and Graft Polymers and Their Nanophase-Separated Hierarchical Structures In Condensed Systems", Kobunshi Ronbunshu, Vol. 63, No. 4, p. 205-218 (2006)).

DISCLOSURE OF INVENTION

It is an object of the present invention to provide a process for producing a microporous polymeric object that is different from conventional processes, and that allows the degree of freedom concerning various properties, such as mechanical property and chemical property in the obtained microporous polymeric object, to be improved, compared to conventional processes.

A process for producing a microporous polymeric object according to the present invention includes the step of thermal-melt mixing a block copolymer (I) with a polymer (II) followed by lowering temperature, or mixing the block copolymer (I) with the polymer (II) in a solvent followed by removing the solvent. The block copolymer (I) is made of three or more kinds of segments having mutually-different monomer units, one or more of the segments are made of monomer units having a first functional group capable of forming ionic bond and/or hydrogen bond, and the block copolymer (I) forms a three-dimensional co-continuous structure due to a phase separation based on incompatibility between the segments. The co-continuous structure has mutually-independent and continuous regions each made of the segments. The polymer (II) has, at other than the terminals of its polymer chain, a second functional group forming ionic bond and/or hydrogen bond with the first functional group, thereby allowing the one or more segments in the block copolymer (I) to be associated with the polymer (II) at many points by the ionic bond and/or hydrogen bond developed between the first and the second functional groups. The process further includes the steps of forming a polymeric object with the co-continuous structure including a region made of polymer (II) and the segments in a state of association with the polymer (II) due to the phase separation, and removing the polymer (II) from the region by weakening the ionic bond and/or hydrogen bond between the first and the second functional groups to form, on the polymeric object, micro pores in a shape corresponding to the region.

In a production process of the present invention, formation of a co-continuous structure due to microphase separation in a block copolymer made of three or more kinds of segments having mutually-different monomer units, i.e. a block copolymer of three or more components, is used. As a result, compared to the cases where a two-dimensional block copolymer or three-dimensional block copolymer of two-component, respectively, called AB-type and ABA-type, as disclosed in JP5-287084A (document 2) and JP11-80414A (document 3), is used, it is possible to widen the composition range of a copolymer where a co-continuous structure is formed (which means, the degree of freedom for the composition range is higher). In a production process of the present invention, although the copolymer (I) and the polymer (II) are mixed, the polymer (II) is removed later. As a result, a microporous polymeric object to be formed is made of the copolymer (I) substantially. For this reason, a high degree of freedom for the composition range of selectable copolymer (I) enables the degree of freedom for various properties to be improved, such as mechanical property and chemical property, in a microporous polymeric object. Further, compared to the case where a pseudo-block copolymer by ionic bond is used, as disclosed in JP2-279741A (document 1), it is possible to better ensure microphase separation, and stabilize the properties of a microporous polymeric object to be formed.

The copolymer (I) is capable of forming a three-dimensional co-continuous structure by itself where, due to microphase separation based on incompatibility between its segments, regions each made of the segments are mutually-independent and continuous.

Further in a production process of the present invention, while forming a co-continuous structure due to the microphase separation in the copolymer (I), there is developed ionic bond and/or hydrogen bond between the first functional group of one or more segments in the copolymer (I) and the second functional group in the polymer (II), thereby allowing the association of the segments with the polymer (II) at many points, resulting in forming a polymeric object with a co-continuous structure including a region made of polymer (II) and the segments in association with the polymer (II). After that, the polymer (II) is removed from the region by weakening the ionic bond and/or hydrogen bond between the first and the second functional groups to form continuous pores. The pores formed by removing the polymer (II) may be in the same shape as the segments of the copolymer (I). In other words, according to a production process of the present invention, it is possible to form pores having a shape corresponding to one continuous structure (the region) among a co-continuous structure in the copolymer (I). A microporous polymeric object having such pores is preferable for use, for example, as a separation membrane.

Further, in a production process according to the present invention, pores are not formed by removing one polymer from a pseudo-block copolymer, dissimilarly to the disclosure of the document 1, nor are they formed by removing a segment from a block copolymer, dissimilarly to the disclosures of the documents 2 and 3. For example, if a microporous object is obtained by removing one segment in a AB-type block copolymer, the microporous object is made of a single component, which means its chemical structure is limited, resulting in considerable lowering of the degree of freedom for selection on its various properties, such as mechanical property, chemical property, thermal property, electric property and optical property. In contrast, in a production process of the present invention, since a co-continuous structure of the block copolymer (I) made of three or more components can be maintained as it is, even after obtaining a microporous polymeric object, it is possible to improve the degree of freedom for various properties, such as mechanical property and chemical property, in the formed microporous polymeric object.

Furthermore, a production process of the present invention is different from the production process disclosed in the document 3 in that macrophase separation is not used for formation of pores. As a result, a microporous polymeric object suitable for use as a separation membrane can be formed.

BRIEF DESCRIPTION OF DRAWINGS

FIG. 9 is a graph showing a measurement result by $^1H$ nuclear magnetic resonance ($^1H$-NMR) to the mixed solution after immersion of a polymeric object in an example.

BEST MODE OF CARRYING OUT THE INVENTION

Figure 1:
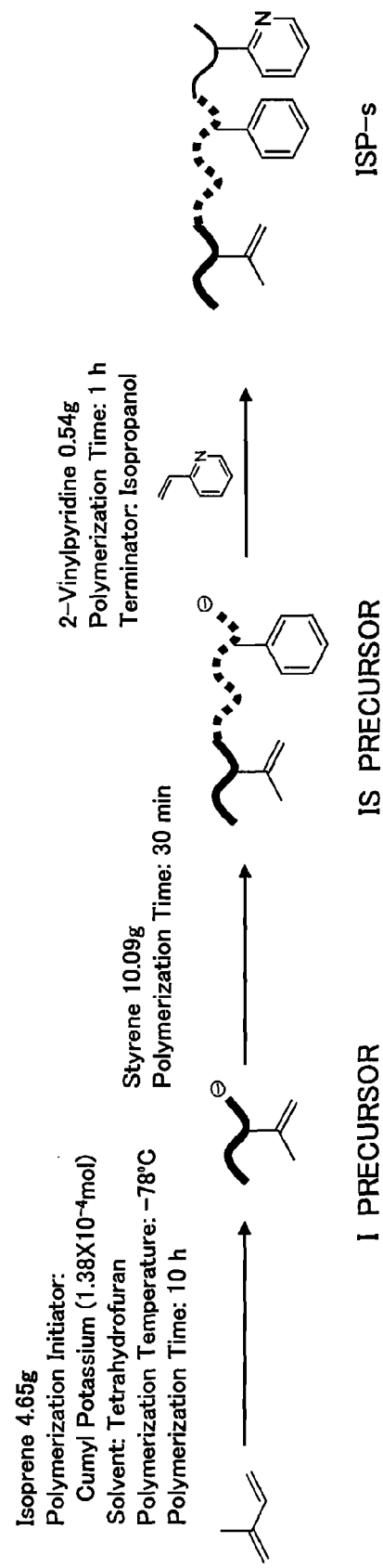
FIG. 1 is a schematic diagram illustrating a synthetic scheme of polyisoprene-polystyrene-poly 2-vinylpyridine (ISP-s), used as a block copolymer (I) in an example.

The block copolymer (I) is not limited specifically as long as (1) the block copolymer is made of three or more kinds of segments having mutually-different monomer units (namely, it is a block copolymer made of three or more component), (2) one or more of its segments are made of monomer units having a first functional group capable of forming ionic bond and/or hydrogen bond, and (3) the block copolymer forms a co-continuous structure having mutually-independent and continuous regions each made of the segments, due to a microphase separation based on incompatibility between the segments.

For example, the copolymer (I) may be a block copolymer made of tree kinds of segments A, B and C having mutually-different monomer units. Typically, the copolymer (I) is a three-component triblock copolymer (ternary block copolymer), so-called ABC-type.

In a two-component triblock copolymer of ABA-type, as disclosed in the documents 2 and 3, loop conformation is observed together with bridge conformation in the formed co-continuous structure. In contrast to this, when the copolymer (I) is a three-component triblock copolymer of ABC-type, bridge conformation alone is observed in the formed co-continuous structure. As a result, its mechanical property such as strength can be improved more than conventional microporous polymeric objects having a mixed loop conformation.

In both copolymers of two-component triblock copolymer and three-component triblock copolymer, a co-continuous structure with three regions being mutually independent and continuous, so-called double gyroid, is formed. In two-component triblock copolymer, two of the regions have the same kind of composition (this structure is called "Bi-Continuous"), while in three-component triblock copolymer, all the three regions each have a different composition (this structure is called "Tri-Continuous"). It is also advantageous that all the three regions each have a different composition, for improving the degree of freedom for various properties, such as mechanical property and chemical property, of a microporous polymeric object to be formed.

Further, in two-component diblock copolymer of AB-type, generally, it is necessary to control the volume fraction of one component very accurately, typically to be 62% to 66%, in order to form a co-continuous structure. In contrast to this, by employing the three-component triblock copolymer of ABC-type, the volume fraction of the component B can be in a widened range of typically about ½ to ⅔ of the total.

The copolymer (I) may be, for example, a block copolymer having segments, only one of which includes the first functional group. In this case, continuous pores in a shape corresponding to one region (a continuous structure) in the formed co-continuous structure can be formed.

The polymer (II) is not specifically limited as long as it has, at other than its terminals, the second functional group forming ionic bond and/or hydrogen bond with the first functional group of the copolymer (I). More specifically, in order to ensure the association of the polymer (II) at many points with the segments of the copolymer (I) having the first functional group, it is preferable that the polymer (II) be a homopolymer made of one kind of monomer units having the second functional group. The polymer (II) may or may not have the second functional group at its terminals.

The molecular weight and the molecular weight distribution of the polymer (II) are not specifically limited. For example, as indicated in the below-described example, a nearly monodisperse homopolymer can be used.

Although the combination of the first and the second functional groups is not specifically limited as long as ionic bond and/or hydrogen bond is formed between both functional groups, it is preferable to be a combination where hydrogen bond occurs between both functional groups. In this case, the bonding force of hydrogen bond is weaker than that of ionic bond, so that it breaks more easily, and thereby the removal of the polymer (II) is easier. Generally, there is no clear border between ionic bond and hydrogen bond, and these two bonds occur simultaneously in many cases. It depends on the combination of the first and the second functional groups whether hydrogen bond is dominant or ionic bond is dominant.

For example, in the case where the first functional group is an azaphenyl group or dialkyl amine group, when the second functional group is a group exhibiting high dissociation of proton such as a sulfonic acid group, the ionic bond is dominant between both functional groups. Meanwhile, in the above case, when the second functional group is a group exhibiting low dissociation of proton such as a hydroxyphenyl group, the hydrogen bond is dominant between both functional groups. Further in the above case, when the second functional group is a carboxyl group exhibiting an intermediate dissociation of proton between sulfonic acid group and hydroxyphenyl group, both functional groups may be bonded by both ionic bond and hydrogen bond.

Examples of such a combination of the first and the second functional groups include a combination of a functional group having a nitrogen atom and a functional group having an oxygen atom.

Specifically, for example, the combination of the first and the second functional groups may be a combination of at least one selected from azaphenyl group, dialkyl amine group, cyano group and morpholine group, and at least one selected from hydroxyphenyl group, sulfonic acid group and carboxyl group. More specifically, for example, it may be a combination of azaphenyl group and hydroxyphenyl group.

The kind of the monomer units constituting each segment of the copolymer (I) is not specifically limited as long as the monomer units are capable of forming a block copolymer. For example, monomer units without the first functional group may be vinyl monomers such as isoprene, styrene, butadiene and 1-butene, acrylic acid ester monomers, or methacrylic acid ester monomers (wherein, the alkyl group of the ester is linear chain or branched alkyl group, with carbon number of 1 to 10).

Monomer units with the first functional group may be, for example, 2-vinylpyridine (having azaphenyl group as the first functional group), 4-vinylpyridine, 2-dimethylaminoethylacrylate, 2-dimethylaminoethylmethacrylate, acrylonitrile, acryloyl morpholine and the like.

The copolymer (I) may be a combination of these monomer units, which is, for example, (polyisoprene-polystyrene-poly2-vinylpyridine) triblock copolymer.

Examples of the kind of monomer units having the second functional group to constitute the polymer (II) include, but are not restricted to, 4-hydroxystyrene (having hydroxyphenyl group as the second functional group).

The polymer (II) may be poly(4-hydroxystyrene) that is a homopolymer of 4-hydroxystyrene.

The block copolymer (I) and the polymer (II) can be formed by a common process for polymerizing a block copolymer and polymer. Various kinds of living polymerization are typical as a polymerization process of a block copolymer.

Due to the thermal-melt mixing, or mixing in a solvent, the copolymer (I) and the polymer (II) become disordered for a while. After that, by cooling the mixture in the case of thermal-melt mixing, or by removing the solvent in the case of mixing in a solvent, due to the above-described association at many points as well as microphase-separation of the copolymer (I), a polymeric object with a co-continuous structure including a region made of the polymer (II) and the segments of the copolymer (I) in association with the polymer (II) is formed.

Process for thermal-melt mixing or mixing in a solvent is not specifically limited, and a known technique may be used. Either process may be selected appropriately, depending on the kinds of the copolymer (I) and the polymer (II).

In a production process of the present invention, the copolymer (I) and the polymer (II) are mixed by thermal-melting or in a solvent to mold a mixture in advance of the initiation of microphase separation in the copolymer (I), and thereby a polymeric object can be formed in an arbitrary shape. For example, by mixing the two in a solvent and applying the mixed solution onto a substrate, followed by drying, heat treatment or the like, as needed, a polymeric object in membrane shape can be formed. Normally, the formed polymeric object can hold its shape also by removing the polymer (II). In such a case, a polymer thin film with micropores can be obtained as a microporous polymeric object.

Although the process for removing the polymer (II) by weakening the ionic bond and/or hydrogen bond between the first and the second functional groups, from a region made of the polymer (II) and the segments of the copolymer (I) in association with the polymer (II) in the formed polymeric object is not specifically limited, the polymer (II) may be removed by weakening the ionic bond and/or hydrogen bond between the first and the second functional groups, for example, by using acid or alkali. More specifically, the polymer (II) may be removed by weakening the bond between the first and the second functional groups, for example, due to impregnation of the formed polymeric object with a solution including acid or alkali.

Although the kind of the acid or alkali is not specifically limited, a kind which causes neither dissolution nor alteration of the copolymer (I) is preferable. Since the polymer (II) can be removed by elution as well as weakening the bond, generally, an organic acid or organic base may be suitable.

Depending on the kind of acid or alkali, it is possible to break the bond between the first and the second functional groups.

In a production process of the present invention, by removal of the polymer (II) from a polymeric object, continuous pores in a shape corresponding to the above-described regions are formed on the polymeric object, forming a microporous polymeric object. These pores may be in substantially the same shape as the segments of the copolymer (I) associated with the polymer (II). Further, the shape of the segments may vary depending on the composition of the copolymer (I). In other words, according to a production process of the present invention, due to the variation in composition of the copolymer (I), it is possible to control the shape of the pores in the microporous polymeric object.

Further, in a production process of the present invention, after the association of the segments of the copolymer (I) having the first functional group with the polymer (II) at many points by ionic bond and/or hydrogen bond, the polymer (II) is removed, thereby forming pores. In other words, on the wall surfaces of the pores formed by removing the polymer (II), there are a large number of the first functional groups of the segments. Accordingly, a production process of the present invention allows formation of a microporous polymeric object where the wall surface of pores has polarity, and further allows control of the polarity level by selecting the first functional group. For example, selecting a functional group that is more likely to form ionic bonds as the first functional group can lead to the wall surface with a relatively high polarity, while selecting a functional group that is more likely to form hydrogen bonds as the first functional group can lead to the wall surface with a relatively low polarity.

A microporous polymeric object where the wall surface of pores has a polarity is suitable for use as a separation membrane.

A microporous polymeric object of the present invention is a microporous object obtained by the above-described process for producing a microporous polymeric object of the present invention. A microporous polymeric object of the present invention includes winding and continuous pores, and, for example, when the microporous object is in a membrane shape, the pores communicate between both main surfaces of the membrane.

Since the pores are formed by removing the polymer (II) associated with the segments of the block copolymer (I) formed due to microphase separation, the diameter of the pores can be less than 1 μm, and typically 100 nm or less, which can be 50 nm or less, or 10 nm or less, depending on the kind, molecular weight, the number of the segments, the producing condition and the like, of the copolymer (I) and the polymer (II). Although there is no minimum diameter of the pores specifically, it may be 1 nm, for example.

A separation membrane according to the present invention includes a polymer membrane having continuous pores communicating between both main surfaces of the membrane, wherein the polymer membrane is made of the above-described microporous polymeric object of the present invention.

EXAMPLES

Hereafter, the present invention is described in detail by way of examples. The present invention is not limited to the below-described examples.

<Synthesis of Block Copolymer (I)>

In this example, three-component triblock copolymer, polyisoprene-polystyrene-poly2-vinylpyridine (ISP-s), was used as a block copolymer (I). The synthetic process is indicated below.

ISP-s was polymerized by using isoprene, styrene and 2-vinylpyridine highly purified under high vacuum as a monomer, and sequential living anionic polymerization process was employed. The specific synthetic scheme is indicated in FIG. 1.

The number-average molecular weight Mn, the molecular weight distribution Mw/Mn (wherein Mw is weight-average molecular weight) of the formed ISP-s, and the volume fraction of each segment in the ISP-s were measured by Multi-Angle Laser Light Scattering (MALLS), Gel Permeation Chromatography (GPC), and $^1$H Nuclear Magnetic Resonance ($^1$H-NMR). The measurement results were as follows in Table 1.

TABLE 1

| | NUMBER-AVERAGE MOLECULAR WEIGHT (Mn) | MOLECULAR WEIGHT DISTRIBUTION (Mw/Mn) | VOLUME FRACTION I:S:P |
|---|---|---|---|
| ISP-s | 126000 | 1.02 | 0.30:0.64:0.06 |
| PtBOs | 12000 | 1.05 | — |
| H-s | 8000 | — | — |

<Synthesis of Polymer (II)>

Figure 2:
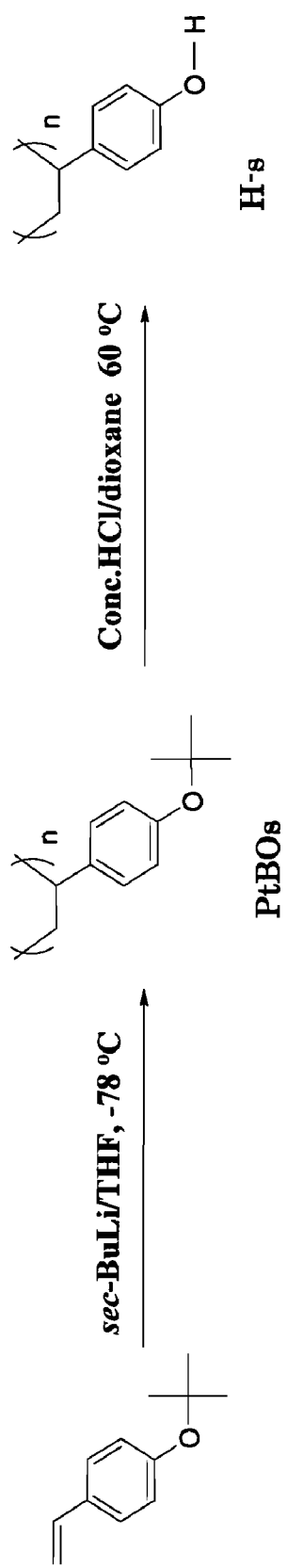
FIG. 2 is a schematic diagram illustrating a synthetic scheme of poly 4-hydroxystyrene (H-s), used as a polymer (II) in an example.

In this example, poly4-hydroxystyrene (H-s) was used as a polymer (II). The synthetic process is indicated below, and the specific synthetic scheme is indicated in FIG. 2.

As the first step of the H-s polymerization, using sec-BuLi as a polymerization initiator and Tetrahydrofuran (THF) as a polymerization solvent, poly4-tert-butoxystyrene (PtBOs) was synthesized by anionic polymerization. The number-average molecular weight Mn and the molecular weight distribution Mw/Mn of the formed PtBOs are indicated in the above Table 1. As indicated in Table 1, the formed PtBOs showed near monodispersity. The measurement of Mw and Mn in the PtBOs was proceeded in the same manner as the ISP-s.

Next, as the second step of the H-s polymerization, H-s was obtained by hydrolyzation of the above formed PtBOs with dioxane-hydrochloric acid mixed solution kept in the temperature of 60° C. The reaction rate estimated based on the measurement results by $^1$H-NMR to the PtBOs and the obtained H-s was nearly 100%, in view of which it was confirmed that the hydrolysis reaction was proceeding quantitatively. Although not specifically measured, the H-s can be assumed to be monodispersed as well as the PtBOs because the H-s was formed by hydrolyzation of the PtBOs.

<Formation of Polymeric Object and Microporous Polymeric Object>

Next, dissolving each of the above-formed ISP-s and H-s into a THF, an ISP-s solution and a H-s solution of 5 wt % concentration were produced. Subsequently, both solutions were mixed to contain 84 wt % ISP-s and 16 wt % H-s, and then the mixed solution was poured into a container. After that, volatilizing and removing the THF by natural drying followed by further drying under vacuum (for a day) and heat treatment (at 180° C., for 24 hours), a polymeric object in thin-film shape was formed. The volume ratio of each segment in ISP-s and H-s calculated from the mixing rate of both solutions and the volume fraction and density of each segment in ISP-s was approximately I (isoprene):S (styrene):P (2-vinylpyridine)+H (4-hydroxystyrene)=1:2:0.75, and the volume fraction thereof was I:S:P:H=0.255:0.553:0.052:0.140.

Next, by drying the formed polymeric object in thin-film shape after immersion into a 1:1 (volume ratio) mixed solution of acetic acid and methanol followed by removal of the H-s by elution, a microporous polymeric object in thin-film shape was formed.

<Evaluation of Polymeric Object and Microporous Polymeric Object>

The phase separation structures in the above formed polymeric object and microporous polymeric object were investigated and observed with transmission electron microscope (TEM) and small angle X-ray scattering (SAXS). In TEM observation, to obtain contrast between I region, S region and P/H region, very thin osmium-stained and iodine-stained slices were prepared as a measurement sample. In SAXS measurement, CuKα line was used as a line source, the camera length was 980 mm, and the measurement time was 10 hours.

Figure 3:
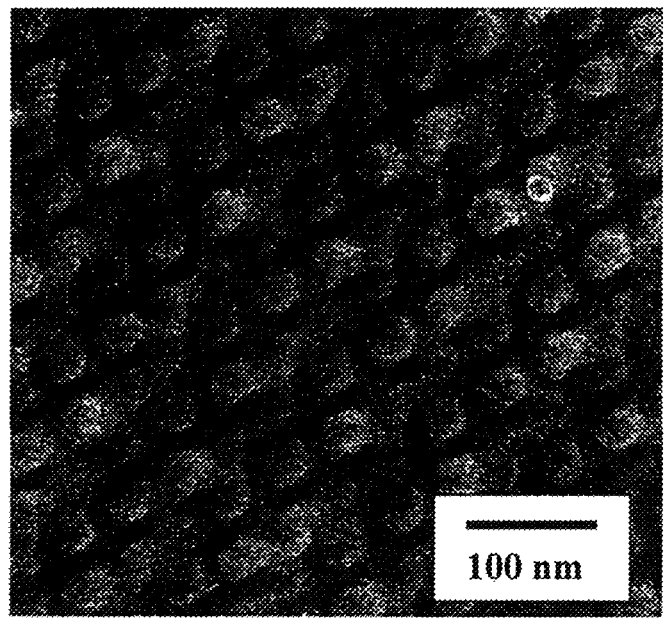
FIG. 3 is a view showing an observed image, by transmission electron microscope (TEM), of a polymeric object produced in an example.
Figure 4:
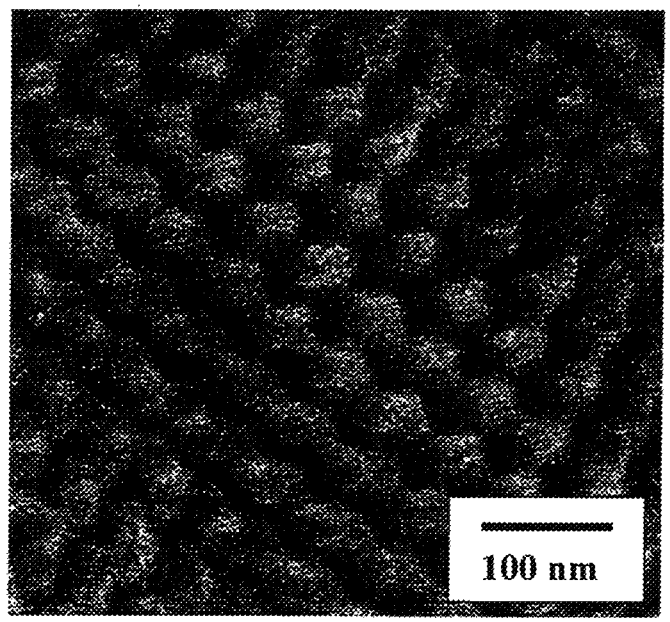
FIG. 4 is a view showing a TEM observed image of a microporous polymeric object produced in an example.

The TEM observation image of the polymeric object is shown in FIG. 3, and the TEM observation image of the microporous polymeric object is shown in FIG. 4. Co-continuous structures being tri-continuous were observed in both images, which indicated that the co-continuous structures were maintained before and after the immersion into the mixed solution of acetic acid and methanol.

Figure 5:
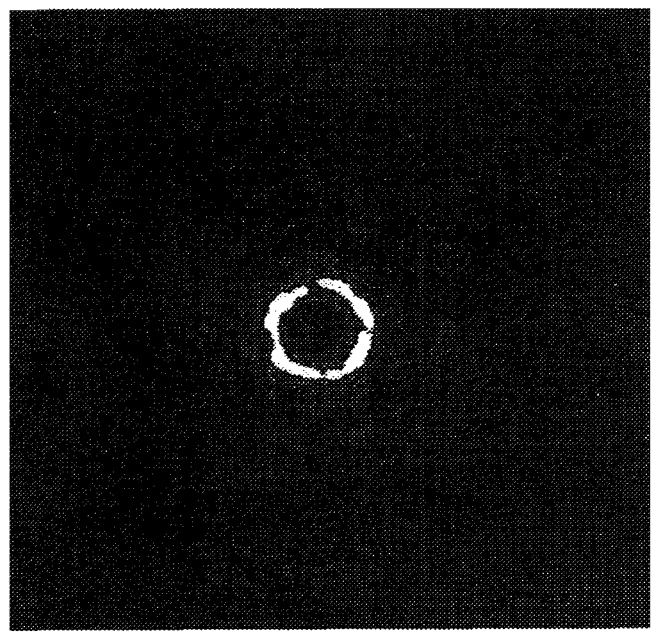
FIG. 5 is a view showing a profile, by small angle X-ray scattering (SAXS), of a polymeric object produced in an example.
Figure 6:
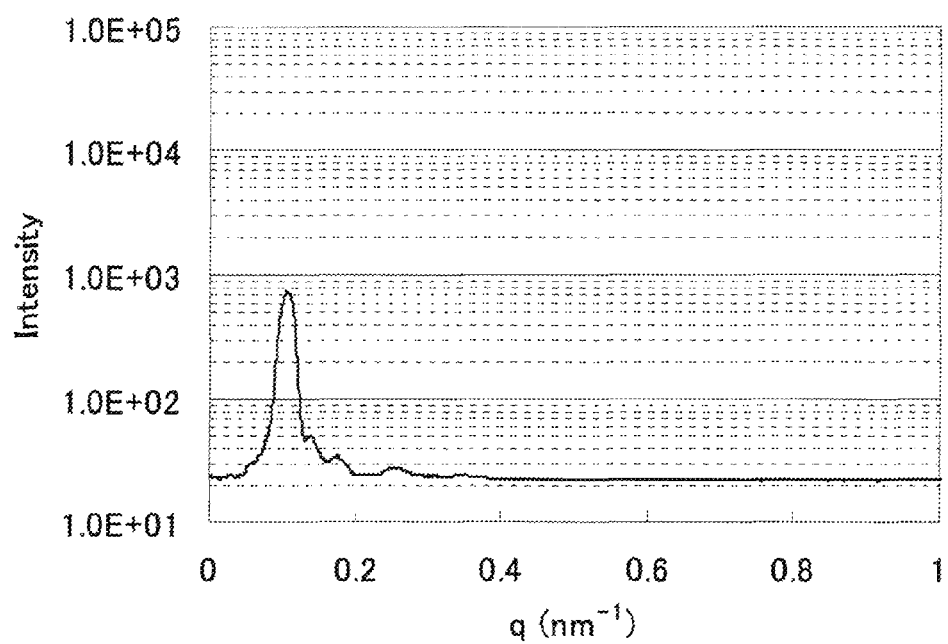
FIG. 6 is a one-dimensional graph by the scattering vector q showing the SAXS profile, shown in FIG. 5.
Figure 7:
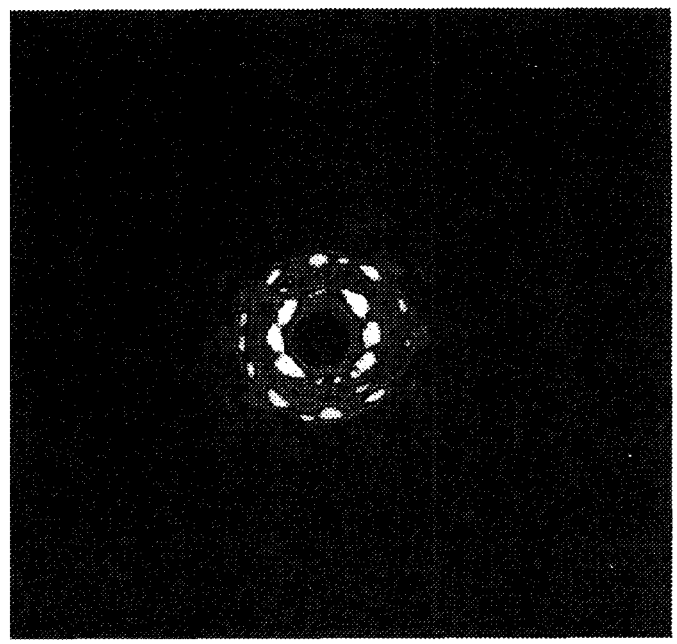
FIG. 7 is a view showing a SAXS profile of a microporous polymeric object produced in an example.
Figure 8:
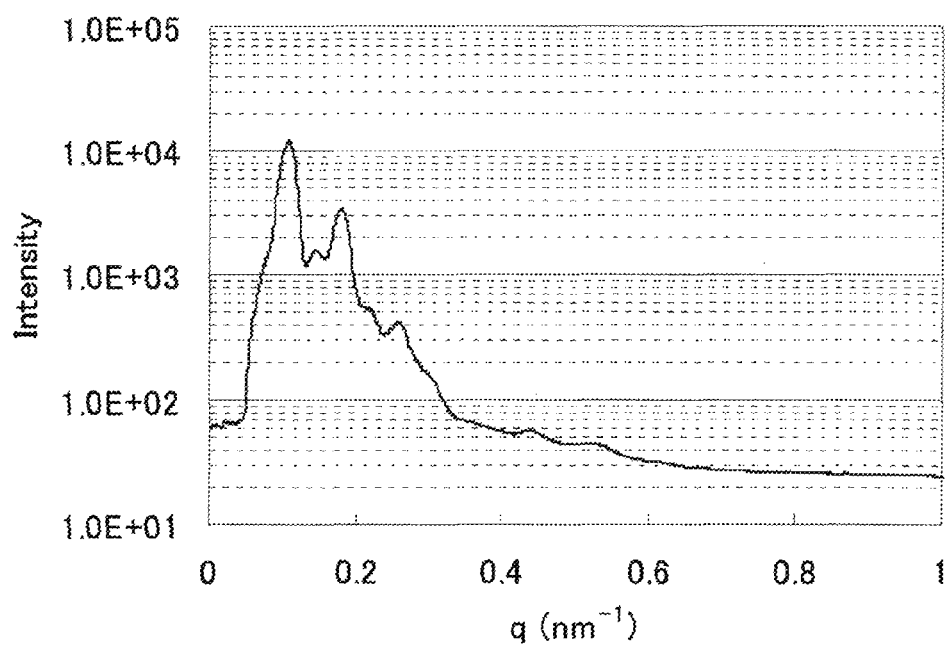
FIG. 8 is a one-dimensional graph by the scattering vector q showing the SAXS profile, shown in FIG. 7.

The SAXS measurement results for the polymeric object are shown in FIG. 5 and FIG. 6, and the SAXS measurement results for the microporous polymeric object are shown in FIG. 7 and FIG. 8. FIG. 6 and FIG. 8 are one-dimensional profiles by the scattering vector q respectively showing the two-dimensional SAXS profiles shown in FIG. 5 and FIG. 7. As shown in FIGS. 5 to 8, especially in FIGS. 6 and 8, due to immersion into the mixed solution of acetic acid and methanol, an increase of the peak intensity was observed, while the peak position observed in FIG. 6 was maintained. This behavior in the profile may be based on that the immersion of the polymeric object into the mixed solution allowed formation of pores while the structural period of the co-continuous structure in the polymeric object was maintained, resulting in the increase of difference between the electron densities in the continuous structures because of the formed pores.

The components contained in the mixed solution after immersion of the polymeric object were evaluated with $^1$H-NMR. As a result, the spectrum of the H-s as the polymer (II) was obtained, and thereby it could be confirmed that the polymer (II) had been eluted non-destructively from the polymeric object, due to immersion into the mixed solution including acetic acid. The measured spectrum by $^1$H-NMR with respect to the mixed solution is shown in FIG. 9. The 1.4 ppm peak corresponds to two protons derived from methylene in the H-s (poly4-hydroxystyrene), the 1.8 ppm peak corresponds to one proton derived from methine in the H-s, the 6.5 ppm peak corresponds to four protons derived from benzene ring in the H-s, and the 8.7 ppm peak corresponds to one proton derived from hydroxyl group in the H-s, respectively.

Further, as well as each evaluation described above, the mass change of the polymeric object before and after immersion into the mixed solution was measured. As a result, it reduced by about 15.8 wt % due to the immersion. Since this reduction amount approximately corresponded to the mass of the H-s added at first, it could be confirmed that the H-s had been removed quantitatively due to immersion into the mixed solution including acetic acid.

The present invention may be embodied in other forms without departing from the spirit or essential characteristics thereof. The embodiments disclosed in this specification are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

According to the present invention, it is possible to provide a process for producing a microporous polymeric object that is different from conventional processes, and that allows the degree of freedom for various properties, such as mechanical property and chemical property, to be improved, compared to conventional processes.

A microporous polymeric object obtained by the production process of the present invention is suitable for use as a separation membrane, such as microfiltration membrane and ultrafiltration membrane.

The invention claimed is:

1. A process for producing a separation membrane, the process comprising the steps of:
thermal-melt mixing, followed by lowering temperature, or mixing in a solvent, followed by removal of the solvent, of
a block copolymer (I) being made of three or more kinds of segments having mutually-different monomer units, one or more of the segments being made of monomer units having a first functional group capable of forming ionic bond and/or hydrogen bond, and the block copolymer (I) forming a three-dimensional co-continuous structure having mutually-independent and continuous regions each made of the segments, due to a phase separation based on incompatibility between the segments, and
a polymer (II) having, at other than the terminals of its polymer chain, a second functional group forming ionic bond and/or hydrogen bond with the first functional group,
thereby allowing the one or more segments in the block copolymer (I) to be associated with the polymer (II) at many points by the ionic bond and/or hydrogen bond developed between the first and the second functional groups followed by the phase separation;
forming a polymeric object with the co-continuous structure including a region made of the polymer (II) and the segments in a state of association with the polymer (II); and
removing the polymer (II) from the region by weakening the ionic bond and/or hydrogen bond between the first and the second functional groups to form, from the polymeric object, a separation membrane having continuous pores that are in a shape corresponding to the region and communicate between both main surfaces of the membrane.

2. The process for producing a separation membrane according to claim 1, wherein
the block copolymer (I) is a block copolymer made of three kinds of segments having mutually-different monomer units.

3. The process for producing a separation membrane according to claim 1, wherein
only one of the segments has the first functional group.

4. The process for producing a separation membrane according to claim 1, wherein
the polymer (II) is a homopolymer made of a monomer unit having the second functional group.

5. The process for producing a separation membrane according to claim 1, wherein
a combination of the first and the second functional groups is a combination where hydrogen bond occurs between both functional groups.

6. The process for producing a separation membrane according to claim 1, wherein
a combination of the first and the second functional groups is a combination of a functional group having a nitrogen atom and a functional group having an oxygen atom.

7. The process for producing a separation membrane according to claim 1, wherein
a combination of the first and the second functional groups is a combination of at least one selected from azaphenyl group, dialkyl amine group, cyano group and morpholine group, and at least one selected from hydroxyphenyl group, sulfonic acid group and carboxyl group.

8. The process for producing a separation membrane according to claim 1, wherein
a combination of the first and the second functional groups is a combination of azaphenyl group and hydroxyphenyl group.

9. The process for producing a separation membrane according to claim 1, wherein
the block copolymer (I) is (polyisoprene-polystyrene-poly2-vinylpyridine) triblock copolymer.

10. The process for producing a separation membrane according to claim 1, wherein
the polymer (II) is poly(4-hydroxystyrene).

11. The process for producing a separation membrane according to claim 1, wherein
ionic bond and/or hydrogen bond between the first and the second functional groups is weakened by acid or alkali.

12. The process for producing a separation membrane according to claim 11, wherein
the acid or the alkali is an organic acid or an organic base.

13. A separation membrane having continuous pores communicating between both main surfaces of the membrane and obtained by the process for producing a separation membrane according to claim 1.

* * * * *